(12) United States Patent
Kanatsu

(10) Patent No.: US 7,420,150 B2
(45) Date of Patent: Sep. 2, 2008

(54) IMAGE PROCESSING APPARATUS, IMAGE PROCESSING METHOD, AND COMPUTER PROGRAM

(75) Inventor: Tomotoshi Kanatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 11/483,059

(22) Filed: Jul. 10, 2006

(65) Prior Publication Data
US 2007/0012862 A1 Jan. 18, 2007

(30) Foreign Application Priority Data
Jul. 12, 2005 (JP) ............................. 2005-203579

(51) Int. Cl.
*G06T 1/00* (2006.01)
*G06F 17/30* (2006.01)
*G06K 9/46* (2006.01)
*H04N 1/00* (2006.01)

(52) U.S. Cl. .................... 250/208.1; 358/474; 382/232; 382/235

(58) Field of Classification Search .............. 250/208.1; 358/471, 474; 382/232, 235, 284
See application file for complete search history.

(56) References Cited

U.S. PATENT DOCUMENTS

| | | | |
|---|---|---|---|
| 5,680,478 A | 10/1997 | Wang et al. | |
| 6,404,930 B2 * | 6/2002 | Inuzuka et al. | 382/235 |
| 6,441,913 B1 * | 8/2002 | Anabuki et al. | 358/1.12 |
| 7,133,565 B2 | 11/2006 | Toda et al. | |
| 7,155,062 B1 * | 12/2006 | Stoica | 382/232 |
| 2004/0223197 A1 | 11/2004 | Ohta et al. | |
| 2006/0045386 A1 | 3/2006 | Fukuoka et al. | |
| 2007/0012862 A1 * | 1/2007 | Kanatsu | 250/208.1 |
| 2008/0137964 A1 * | 6/2008 | Takahashi | 382/209 |

FOREIGN PATENT DOCUMENTS

| | | |
|---|---|---|
| JP | 2002-077633 | 3/2002 |
| JP | 2004-265384 | 9/2004 |

* cited by examiner

*Primary Examiner*—John R Lee
(74) *Attorney, Agent, or Firm*—Fitzpatrick, Cella, Harper & Scinto

(57) ABSTRACT

An image processing apparatus capable of easily acquiring original data includes an image data storage unit adapted to store data contained in an image, an image reading unit adapted to convert the contents of a paper document into an image by photoelectric conversion, a region specifying unit adapted to partially or entirely specify the read image, an image compression unit adapted to compress the read image to generate compressed data, an image data search unit adapted to search the storage unit for image data similar to the specific region, and an information adding unit adapted to add, to the compressed data, a search result corresponding to the specific region as related image information.

13 Claims, 11 Drawing Sheets

FIG. 8

```
    :
801 ⎧ <Region id="994adc" type = "Text">
    ⎪   <X>310</X>
    ⎨   <Y>192</Y>
    ⎪   <Width>387</Width>
    ⎪   <Height>265</Height>
    ⎩ </Region>

802 ⎧ <Region id="46a79b" type = "Image">
    ⎪   <X>10</X>
    ⎪   <Y>400</Y>
    ⎪   <Width>624</Width>
    ⎪   <Height>486</Height>
    ⎨   <Related>                                                           ⎫
    ⎪     <Item ref="http://db1.local/992432" score="95" editable="false"/> ⎪
    ⎪     <Item ref="http://db2.ext/64229" score="88" editable="true"/>     ⎬ 803
    ⎪     <Item ref="http://db2.ext/1321429" score="28" editable="false"/>  ⎪
    ⎪   </Releated>                                                         ⎭
    ⎩ </Region>
    :
```

FIG. 9
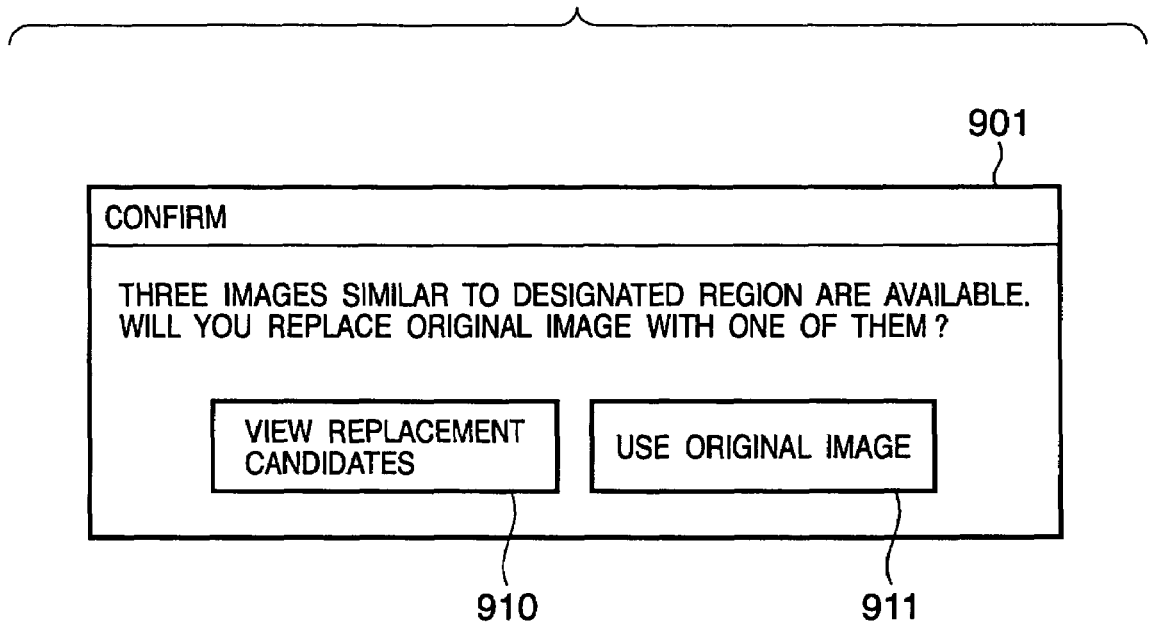
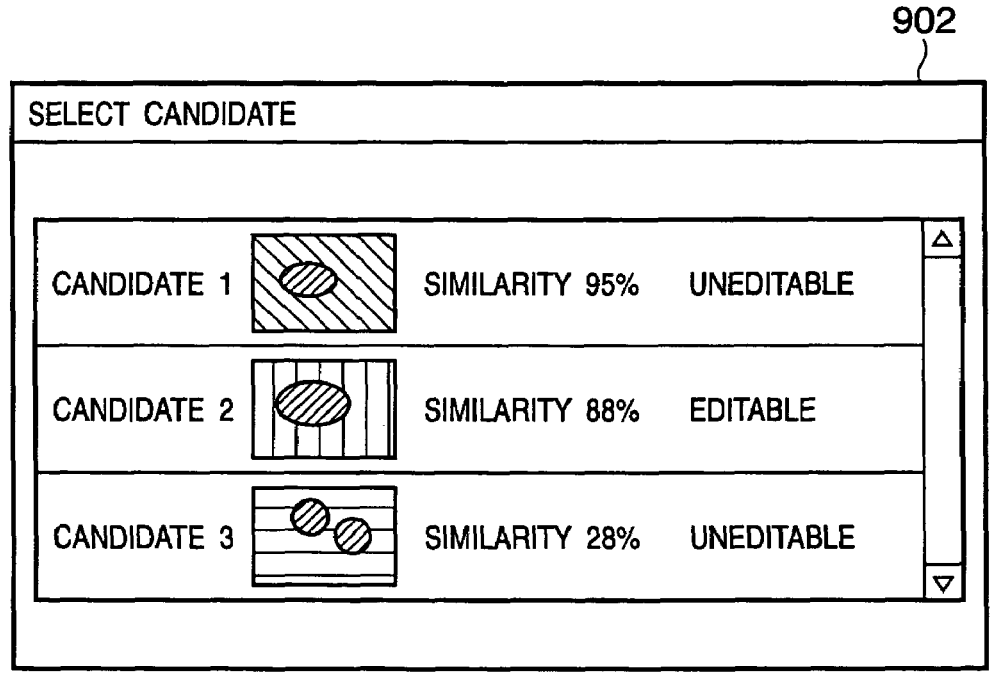

IMAGE PROCESSING APPARATUS, IMAGE PROCESSING METHOD, AND COMPUTER PROGRAM

BACKGROUND OF THE INVENTION

1. Field of the Invention

The present invention relates to an image processing apparatus, image processing method, and computer program and, for example, to a technique suitable for saving a paper document as a digital document and the saved paper document to edit the digital document.

2. Description of the Related Art

Along with the recent spread of scanners, digitization of documents is becoming more popular. However, when a digital document with, e.g., an A4 size is saved in a full-color bitmap format, the amount of data is as large as about 24 Mbytes at 300 dpi and requires an enormous storage area. In addition, data of such a large amount is unsuitable for digital transmission.

Such a full-color image is normally compressed, and JPEG is known as a compression method. JPEG can be used to compress a natural image such as a photo very effectively and ensure a high quality. However, when a high-frequency portion such as a text part is compressed by JPEG, image degradation called mosquito noise occurs. Additionally, the compression ratio is also low. Since many general documents include both text and images on one page, it is difficult to ensure both high image quality and a high compression ratio using JPEG.

To solve the above-described problems, region segmentation is executed. A background portion except text regions is subjected to JPEG compression, and each text region with color information is subjected to MMR compression. At the time of decompression, a white JPEG image portion is passed, and the black portion is expressed with a representative text color. According to an image processing apparatus disclosed in, e.g., Japanese Patent Laid-Open No. 2002-77633, an image is obtained by scanning a paper document. Binarization and lossy encoding are executed for a text region without decreasing the resolution while JPEG compression is executed for the background part at a high compression ratio by decreasing the resolution. With this processing, a digital document in a small size suitable for transmission and storage can be obtained without losing color information and text readability.

With the spread of computers, a document creating/editing operation using a document editor application such as a word processor has become common. Not only a demand for browsing a document digitized and saved in the above-described manner but also a demand for entirely or partially inserting a digital document into another document and editing/processing it is growing.

To meet part of this requirement, an image processing apparatus disclosed in, e.g., Japanese Patent Laid-Open No. 2004-265384 specifies an original document file corresponding to the image data of a scanned document by searching a database or the like and actually prints or reuses the original document file to ensure high image quality and editability.

However, a digital document created by scanning is compressed to increase the efficiency for saving the image data, as described above. Hence, if this document is used to create another document, degradation in image by compression poses a problem.

A digital document created by the image processing apparatus disclosed in Japanese Patent Laid-Open No. 2002-77633 holds data that has undergone lossless encoding without decreasing the resolution in a text region. For this reason, the image of this region can be extracted and used without concern for degradation. However, the part other than the text region, i.e., the background region is compressed at a high ratio, and therefore, the problem of image degradation in use cannot be avoided.

In the image processing apparatus disclosed in Japanese Patent Laid-Open No. 2004-265384, a scanned document is replaced with its original document file obtained by a search. For this reason, the data amount is not always small, and the efficiency of transmitting or saving the digital document is not always high.

In addition, in an environment where a document is created by using a document editor application such as a word processor, photos and drawings suitable for reuse may be registered in a database as individual datum. If a document newly created by using these data is not registered in the database as a document file, the original data that should exist in the database cannot be acquired for the target part even by scanning the document by the image processing apparatus.

There is a demand for a technique of solving the above-described problems, i.e., generating data with a high transmission and saving efficiency from a scan image and, when this data is to be used for, e.g., document editing, easily acquiring original data for the target part.

In consideration of the above-described problems, the present invention has as its object to enable easy acquisition of original data.

SUMMARY OF THE INVENTION

In order to achieve the above object, an image processing apparatus and image processing method according to the present invention are characterized by having the following arrangement.

According to the present invention, the foregoing object is attained by providing an image processing apparatus comprising:

an image data storage unit adapted to store data contained in an image;

an image reading unit adapted to convert contents of a paper document into the image by photoelectric conversion;

a region specifying unit adapted to partially or entirely specify the read image by the image reading unit;

an image compression unit adapted to compress the read image by the image reading unit to generate compressed data;

an image data search unit adapted to search the image data storage unit for image data similar to a specific region specified by the region specifying unit; and an information adding unit adapted to add, to the compressed data, a result of search by the image data search unit corresponding to the specific region specified by the region specifying unit as related image information.

According to another aspect of the present invention, the foregoing object is attained by providing an image processing method comprising steps of:

partially or entirely specifying an image;

compressing the image to generate compressed data;

searching for image data similar to a specific region specified in the specifying step; and adding, to the compressed data, a result of search in the image data search step corresponding to the specific region specified in the specifying step as related image information.

According to the present invention, a user scans a paper document, transmits the data to his/her computer apparatus such as a PC, and saves the data in it. The transmission data is compressed at a high ratio to increase the transmission efficiency or saving efficiency. In the transmission data, information representing the location and editability of each image related to regions of incorporated graphic, photo, and the like is described. If original data used to generate the scanned paper document can be acquired from the database, the data is acquired by using the information. Hence, data having an image quality and editability more suitable for document editing can be used than an image extracted from the transmission data itself.

As the special effect of describing the information in the transmission data, the operation efficiency in utilization improves because search is unnecessary then. If an image in transmission data compressed at a high ratio is used, accurate search may be impossible because of a decrease in information amount. Hence, the information described in advance can be used as more reliable information.

As an effect of adding editability information to the information, the user can immediately know in utilization whether editable alternate data for a selected region is present. Hence, the efficiency of operation such as document editing improves.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a view showing an example of transmission data according to the embodiment of the present invention;

FIG. 9 is a view showing an example of a user interface window in utilization according to the embodiment of the present invention;

DESCRIPTION OF THE EMBODIMENTS

Preferred embodiments of the present invention will now be described in detail in accordance with the accompanying drawings.

First Embodiment

Figure 2:
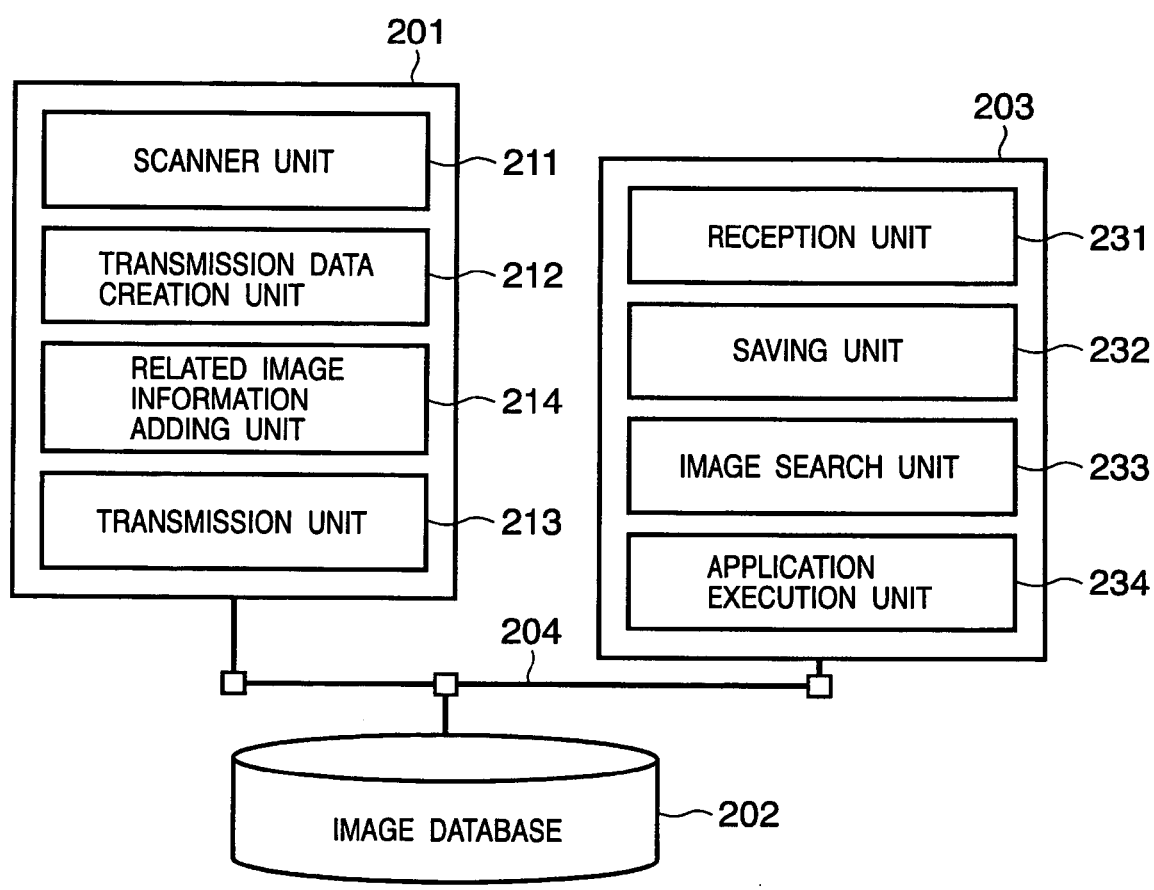
FIG. 2 is a block diagram showing the arrangement of an apparatus according to the embodiment of the present invention.

FIG. 2 is a block diagram showing an image search system according to the embodiment of the present invention.

An image processing apparatus 201 comprises a scanner unit 211 which photoelectrically converts a paper document to form image data, a transmission data creation unit 212 which creates transmission data by, e.g., compressing the scanned image data, a related image information adding unit 214 which obtains, information of image data related to an input image by searching an image database or the like and adds the information to the transmission data, and a transmission unit 213 which transmits the transmission data to the outside of the image processing apparatus 201.

An image database 202 saves photo and drawing data. Images here include data containing vector path rendering command groups, e.g., data of SVG format or other application format in addition to so-called raster images. However, search can be done on the basis of an image feature amount independently of the data format.

A general-purpose computer apparatus 203 comprises a reception unit 231 which receives the transmission data transmitted from the image processing apparatus 201, a saving unit 232 such as a memory or hard disk that saves received data, and an image search unit 233 which acquires necessary image data from the image database 202. An application execution unit 234 executes a program to use the data. The image processing apparatus 201, image database 202, and computer apparatus 203 are connected through a wired or wireless network 204 such as a LAN or Internet.

The outline of processing according to this embodiment which is executed by using the apparatus groups shown in FIG. 2 will be described below in two steps. Each step will be described later in detail.

In the first step, i.e., transmission step, a user scans a paper document by using the image processing apparatus 201, transmits the data to his/her PC, i.e., computer apparatus 203, and saves the data in it. The data transmitted at this time is obtained by compressing the scan image at a very high compression ratio to obtain a high transmission and saving efficiency.

The paper document scanned by the user is obtained by creating a digital document on the computer apparatus 203 or another computer on the LAN and printing it. The digital document is created by using some photos and graphics stored in the image database.

In consideration of this, the transmission step includes a step of acquiring, from the database, information of images similar to the image parts such as photos and graphics contained in the transmission data generated from the scanned paper document and adding the information to each image part as related image information.

In the second step, i.e., utilization step, the user creates new data by using part of the previously saved data. For example, an application having a document editing function is executed on the computer apparatus 203, and photo, graphic, and text parts contained in the saved data are selectively extracted and inserted into the document under edition.

Image data that can be extracted from saved data in correspondence with a selected region is information compressed at a high ratio and therefore has a poor quality. An image of a photo or graphic part is lossly encoded by decreasing the resolution and therefore has a poor quality.

Hence, as assumed above, if data corresponding to the original data of the part can be acquired from the image database 202, the data can be used more suitably by the user to edit the document in terms of image quality and re-editability than the data extracted from the saved data. Hence, this step includes a step of acquiring image data corresponding to the part from the database by using related image information contained in the saved data.

Processes of the two steps will be described below in detail.

The transmission step, i.e., the operation of causing the user to scan a paper document by using the image processing apparatus 201 and transmit the contents to his/her PC, i.e., computer apparatus 203 will be described first with reference to the flowcharts in FIGS. 3A and 3B.

Figure 3A:
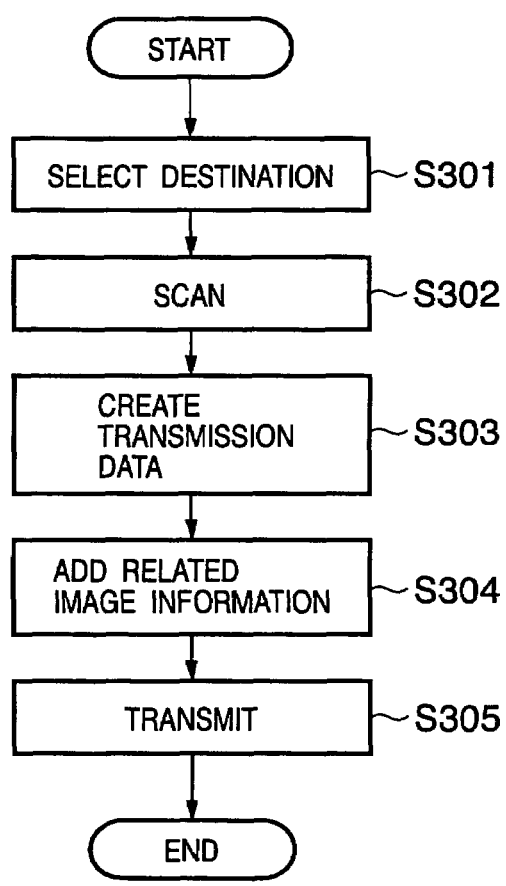
FIGS. 3A and 3B are flowcharts showing the general operation of the image processing apparatus according to the embodiment of the present invention.

FIG. 3A is a flowchart showing the operation of the image processing apparatus 201.

In step S301, the user designates, on the image processing apparatus 201, the destination of scan data by using a UI (not shown). In this example, the computer apparatus 203 is designated.

In step S302, the scanner unit 211 converts a placed paper document into digital image data by known photoelectric conversion processing. In step S303, the transmission data creation unit 212 creates transmission data by executing predetermined processing such as compression and feature amount extraction for the image data.

In step S304, the related image information adding unit searches the image database 202 by using the image data feature amount contained in the transmission data and adds obtained information to the transmission data. Processing in steps S303 and S304 will be described later in detail. In step S305, the transmission unit 213 transmits the transmission data created in step S303 to the destination designated in step S301.

Figure 3B:
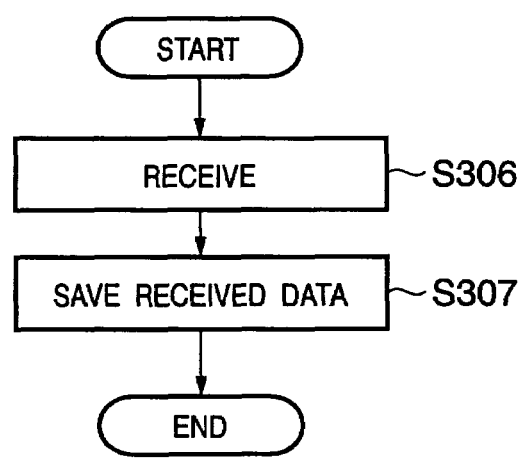

FIG. 3B is a flowchart showing the operation of the computer apparatus 203.

In step S306, the reception unit 231 receives the transmission data transmitted in step S305. In step S307, the received data is saved in the saving unit 232.

Processing in steps S303 and S304 in FIG. 3A will be described next in detail.

Figure 1:
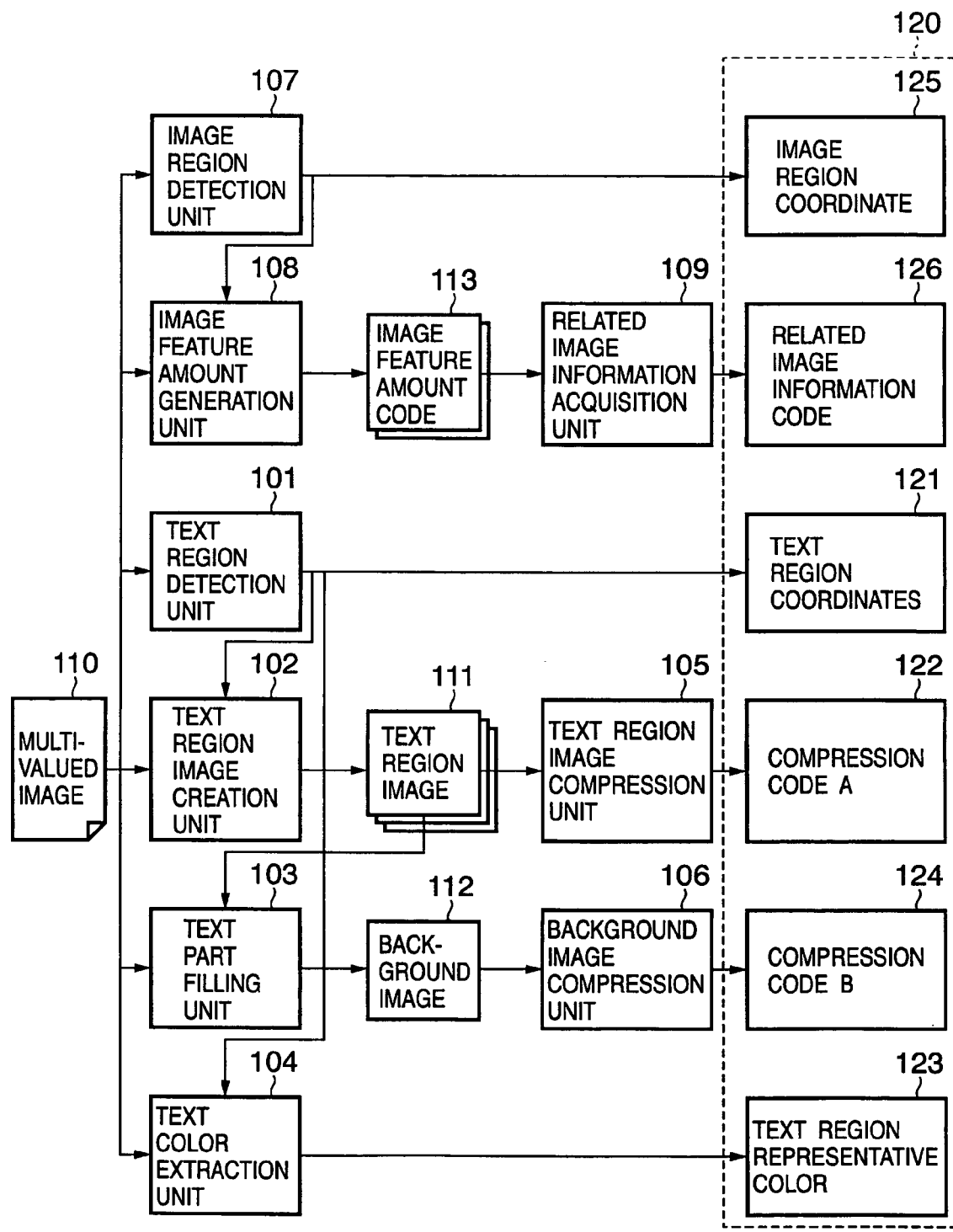
FIG. 1 is a block diagram for explaining a transmission data creation part according to an embodiment of the present invention.

FIG. 1 is a block diagram showing the arrangements of the transmission data creation unit 212 and related image information adding unit 214.

Reference numeral 101 denotes a text region detection unit; 102, a text region image creation unit; 103, a text part filling unit; 104, a text color extraction unit; 105, a text region image compression unit; 106, a background image compression unit; 107, an image region detection unit; 108, an image feature amount generation unit; and 109, a related image information acquisition unit.

Figure 5:
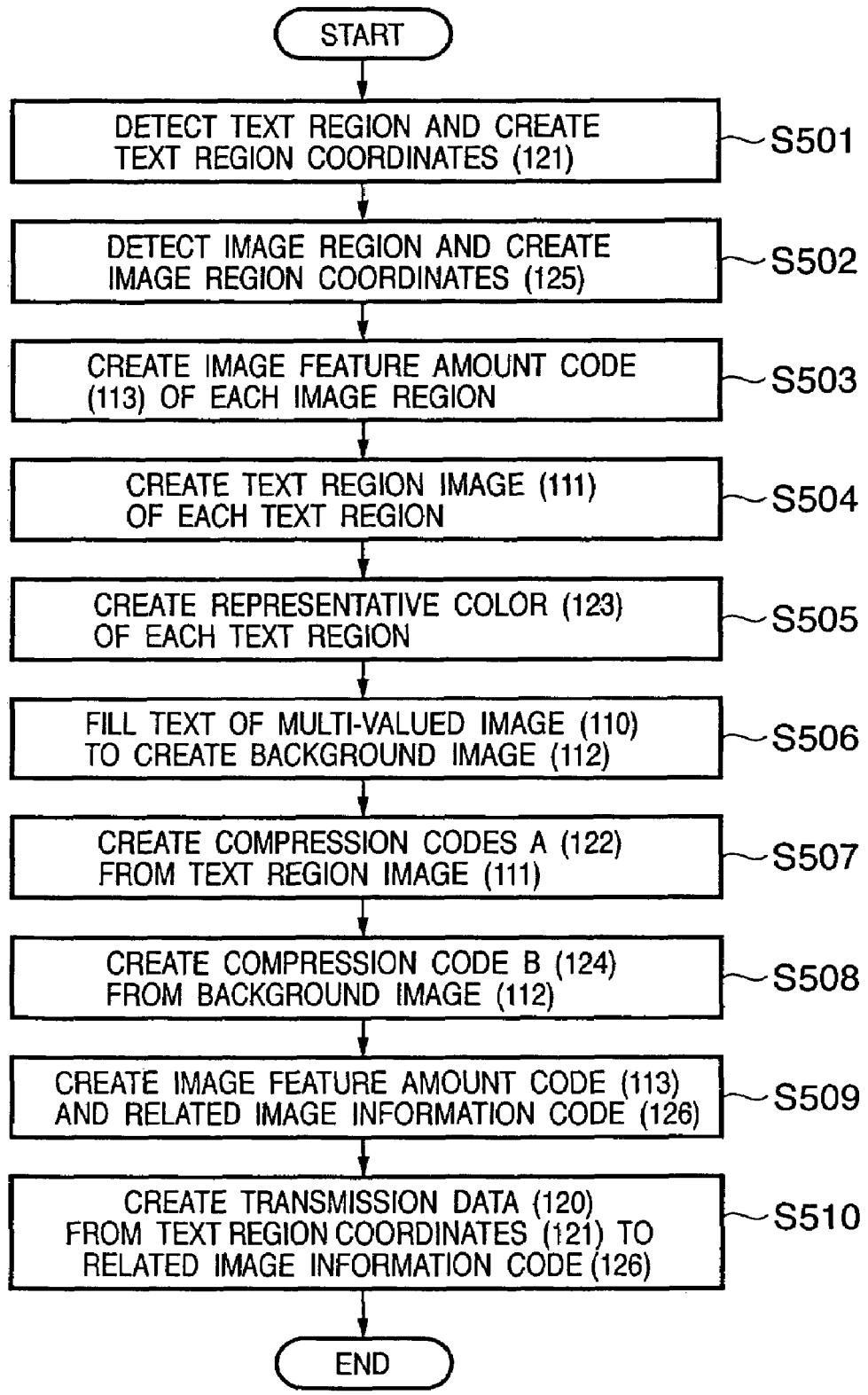
FIG. 5 is a flowchart showing the creation operation of the image processing apparatus according to the embodiment of the present invention.

The operations of these units will be described with reference to the flowchart in FIG. 5.

In step S501, the text region detection unit 101 detects a text region in an input multi-valued image 110 and creates a plurality of text region coordinates 121.

To detect a text region, a known region segmentation technique can be used. The region segmentation technique executes processing of segmenting image data of one page into regions having attributes such as "text", "graphic", "photo", "line", and "table".

An example of the region segmentation technique is described in U.S. Pat. No. 5,680,478 "Method and Apparatus for Character Recognition" (Shin-Ywan Wang et al: Canon K. K.). The contents of implementation will briefly be described below.

First, an input multi-valued image is binarized to create a monochrome image. Binarization is done by using a known method. Next, 8-connected black pixel outline tracing is executed for the monochrome image to extract black pixel blocks. In a black pixel block with a large area, 4-connected white pixel outline tracing is executed to extract white pixel blocks. In a white pixel block with a predetermined area or more, black pixel outline tracing is executed again to extract black pixel blocks. The obtained black pixel blocks are classified on the basis of the size, shape, and density and grouped as needed so that they are classified into regions with different attributes such as "text", "graphic", "photo", "line", and "table".

For example, a pixel block having an aspect ratio of about 1 and a size within a predetermined range is defined as a pixel block corresponding to a character. A portion where pixel blocks corresponding to characters in the vicinity can be grouped orderly is determined as a text region. Of the remaining black pixel blocks, a pixel block flat over a predetermined length is singly determined as a line region. A range occupied by black pixel blocks orderly including white square pixel blocks with a predetermined size or more is determined as a table region. A region where parts with scattered pixel blocks of indefinite shape are grouped is determined as a photo region. A region occupied by pixel blocks of arbitrary shape is determined as a graphic region.

Figure 6:
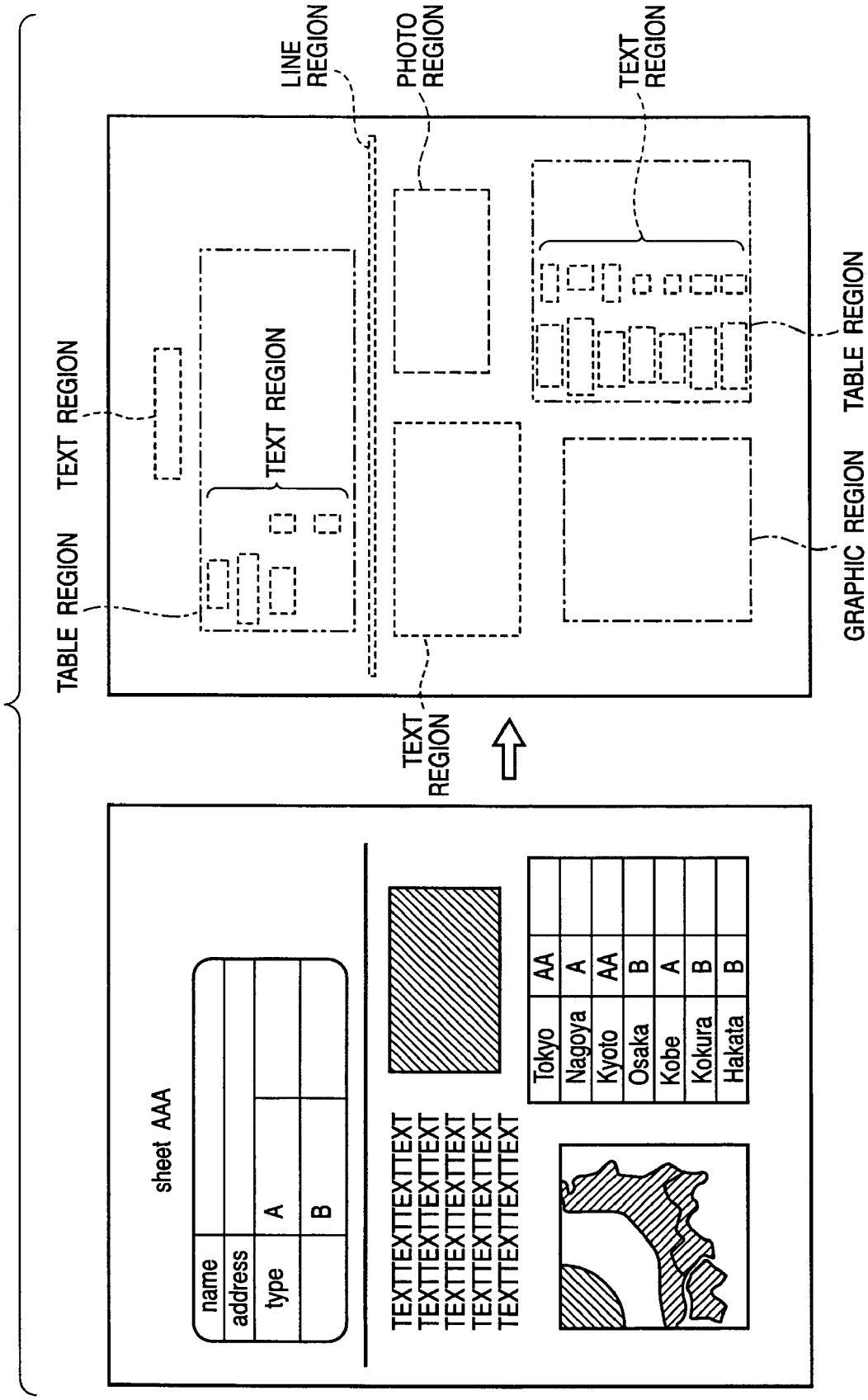
FIG. 6 is a view showing an example of a detection result of text, image, and other regions of a document image according to the embodiment of the present invention.

FIG. 6 is a view showing an example of an input multi-valued image (left) in region segmentation and a segmentation result (right).

The text region coordinates 121 are created from the text region obtained by region segmentation. In step S502, the image region detection unit 107 detects an image region such as a photo region or graphic region in the input multi-valued image 110 and creates a plurality of image region coordinates 125.

To detect an image region, the result of region segmentation processing executed in step S501 can be used. More specifically, the image region coordinates 125 are created by regarding a photo or graphic region obtained from the region segmentation processing result as an image region. In step S503, the image feature amount generation unit 108 creates an image feature amount code 113 as the image feature amount of each image on the basis of the image region coordinates 125 and multi-valued image 110.

The image feature amount can be a color histogram, color structure, edge histogram, or texture extracted from the image. The purpose of extraction is to search the image database 202 for image data. Hence, the image feature amount is obtained in accordance with a predetermined scheme used in the image database 202.

An edge histogram will be described as an example of the image feature amount used in the image database 202. An edge histogram is a feature amount vector having a total edge amount of 4×4×5=80, which is obtained by segmenting an image into 4×4 blocks in a grid and extracting the edge amounts of five kinds of edges, i.e., a vertical edge, horizontal edge, 45° edge, 135° edge, and edge without direction. An edge amount is obtained by quantizing the total number of pixels representing an edge with respect to the total number of pixels of each block. More specifically, when a block is segmented into sub-regions in statistically enough number, an edge amount can be obtained from the luminance distribution in each sub-region by using filters corresponding to the five kinds of edges. The image feature amount may be extracted in accordance with a feature amount used in the image database 202 by using an image feature amount of another method or combining a plurality of image feature amounts.

In step S504, the text region image creation unit 102 creates a text region image 111 from the text region coordinates 121 and multi-valued image 110. More specifically, a binary image is acquired by executing a known binarization method for each text region range in the multi-valued image 110. In the binary image, pixels corresponding to text lines have a pixel value of 1, and the remaining pixels have a pixel value of 0.

In step S505, the text color extraction unit 104 calculates a text region representative color 123 of a text line portion while referring to the original image and the text line part pixel of the text region image 111. In text color extraction, a thinned binary image is created by executing thinning for a text line of the corresponding text region image 111. The average of pixel values on the multi-valued image 110 corresponding to pixels of value 1 on the thinned binary image is defined as the text color of the region. If the variation in obtained pixel values is large, the text region may be segmented into characters, and a text color may be assigned to each character.

In step S506, the text part filling unit 103 fills pixels on the multi-valued image 110 corresponding to the black pixels of the text region image 111 with the same color as the peripheral color, thereby creating a background image 112.

Text part filling is done in the following way. First, a binary image is created by increasing the thickness of the target text region image 111 by one pixel. To do this, four images are created by, e.g., shifting the text region image 111, i.e., binary image by one dot to the upper, lower, left, and right sides and superimposing the five images including the original image by ORing the pixels. The average value of pixels on the multi-valued image 110 is obtained in correspondence with pixels of 0 on the binary image. When text part pixels on the multi-valued image 110, i.e., pixels of 1 on the thick binary image are filled with the average pixel value, the text part is filled, including smearing pixels around the text. Hence, the background image 112 with higher flatness can be obtained.

In step S507, the text region image compression unit 105 compresses the plurality of text region images 111 and creates a plurality of compression codes A 122. In this case, the compression codes A 122 are created by compressing the binary text region images by MMR.

In step S508, the background image compression unit 106 compresses the background image 112 and creates a compression code B 124. In this case, the background image 112 is thinned to a ½ resolution and then compressed by JPEG to create the compression code B 124. The resolution conversion ratio may be changed to, e.g., 33% or 25% in accordance with the target compression ratio.

In step S509, the related image information acquisition unit 109 acquires, from the database 202, image information related to each of images corresponding to the plurality of image region coordinates 125 and creates a related image information code 126.

In this case, the image database 202 is searched by using the image feature amount code 113 corresponding to each of the plurality of image region 125. An image with a high similarity is selected from the registered images by feature amount matching. If two or more image data are selected as candidates, information about each image data is acquired as related image information. More specifically, the related image information acquisition unit 109 acquires image data location information, feature amount matching similarity, and information representing whether the image data can be edited, i.e., whether rendering command data such as the path of the image can be acquired from registered image data.

In step S510, the data of the text region coordinates 121 to related image information code 126 are combined to form transmission data 120. As the format of the transmission data, PDF is used. The compression codes A 122 and B 124 are described as rendering data, and the remaining pieces of information, i.e., information of image and text regions and image information related to the regions are described by an XML object format as metadata. A format except PDF may be used, as a matter of course. For example, rendering data may be described by using the SVG format so that the entire data is described in the XML format. Alternatively, all data may be described as binary data.

FIG. 8 shows a detailed example of metadata description. Reference numeral 801 indicates a description example of a text region; and 802, a description example of an image region. Each region has the x- and y-coordinate values of the upper left corner, width, and height as position information. The description 802 includes an information group 803 of images related to the region. The information 803 includes information of images similar to the region, which are searched from the image database, and has a description of URL information representing locations, similarity values, and information representing whether the data can be edited. This is merely an example, and any other format may be used for description.

Figure 4:
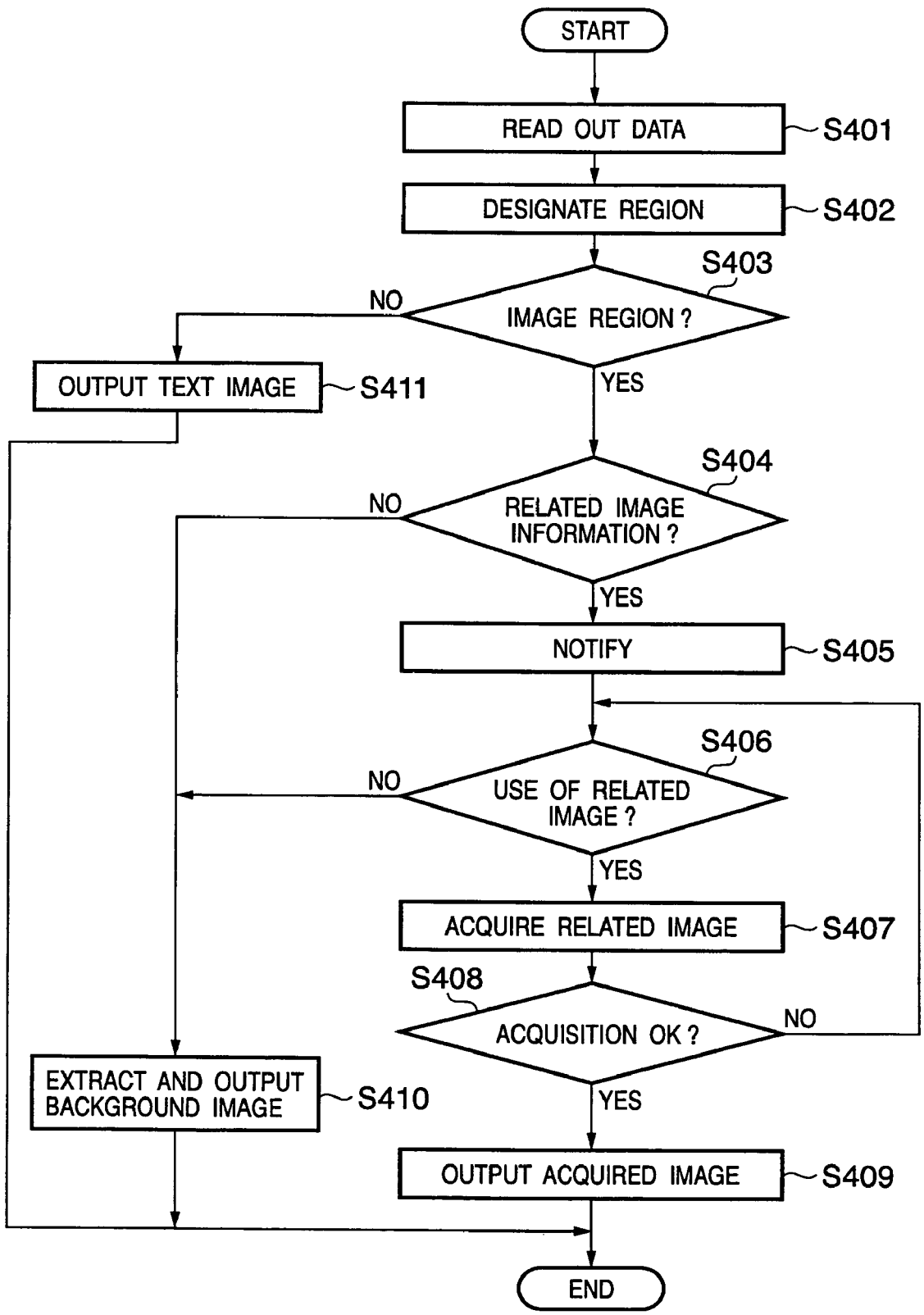
FIG. 4 is a flowchart showing the utilization operation of the image processing apparatus according to the embodiment of the present invention.

The step of using saved data will be described next with reference to the flowchart shown in FIG. 4.

In step S401, data saved in the saving unit 232 is readout on the basis of a user instruction.

In step S402, the user designates a region of a scan page represented by the data by using a means such as a display, mouse, or keyboard (not shown) connected to the computer apparatus 203.

Figure 7:
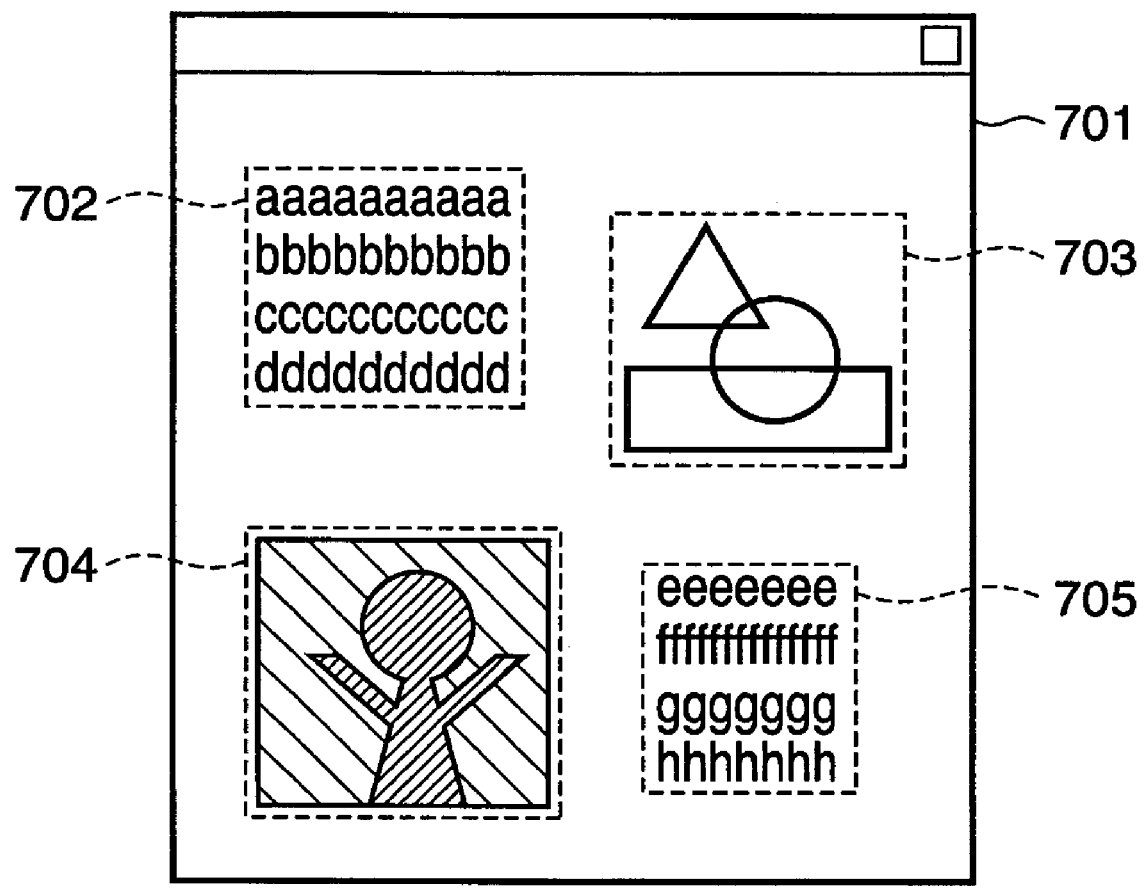
FIG. 7 is a view showing an example of a user interface window in utilization according to the embodiment of the present invention.

FIG. 7 shows an example of a UI window to designate a region. A page image 701 is created by executing decompression to reconstruct the page from the data 120. More specifically, when a text image obtained by decompressing the compression codes A 122 is rendered on an image obtained by decompressing the compression code B 124 on the basis of the text region coordinates 121, the page image 701 of the example can be obtained.

Reference numerals 702 to 704 denote frames indicating regions that the user can select. Reference numeral 702 and 705 denote designation frames of text regions corresponding to the text region coordinates 121; 703, a graphic region; and 704, a photo region. When the user selects one of the frames 702 to 705 by a general GUI operation using a mouse or keyboard, the region as the extraction target can be designated.

Referring back to FIG. 4, if it is determined in step S403 that the region designated in step S402 is an image region, the flow advances to step S404. Otherwise, the flow advances to step S411.

In step S404, it is checked whether the designated image region holds information of images related to the region. If it is determined by the check that the region holds the information, the flow advances to step S405. Otherwise, the flow advances to step S410.

In step S405, the user is notified of the presence of information of the images related to the designated region. In step S406, one of the related images is selected, and it is determined whether to acquire the selected related image from the database and output it or output the data of the image portion contained in the saved data. If it is determined to acquire and output the related image, the flow advances to step S407. If it is determined to output the image portion in the saved data as data, the flow advances to step S410.

FIG. 9 shows an example of a user interface window related to steps S405 and S406. A window 901 is a notification window displayed when the saved data has the three related images 803 in the example shown in FIG. 8 in correspondence with the designated region. A window 902 presents information about the related images 803 in FIG. 8 as candidates and prompts the user to select one of them. The window 902 is displayed when a button 910 is selected on the window 901.

Figure 10:
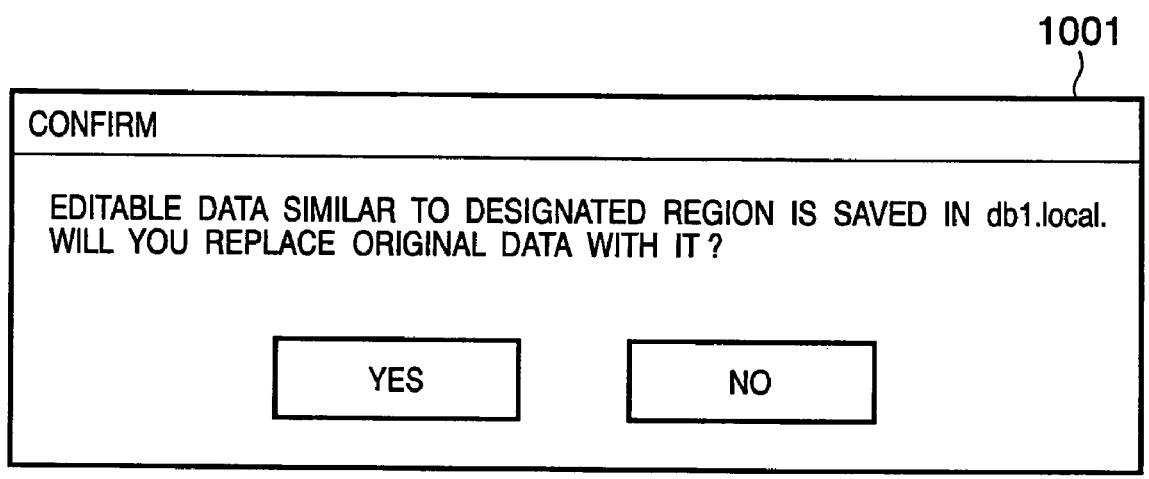
FIG. 10 is a view showing another example of the user interface window in utilization according to the embodiment of the present invention.

FIG. 10 is a view showing another example of the user interface related to steps S405 and S406. A window 1001 is a notification window displayed when editable data is present in the related image information held by the designated region. When a plurality of selection candidates are present, the interface may automatically select information most suitable for utilization and inquire of the user about utilization of it.

In step S407, the related image selected in step S406 is acquired from the database. More specifically, the image data as the acquisition target is requested and acquired on the basis of the address in the database, which is described in the location information corresponding to the selected related image.

In step S408, it is determined whether to actually output the acquired image data. If affirmative determination is done, the flow advances to step S409. If negative determination is done, the flow returns to step S406 to select related image information again.

Figure 11:
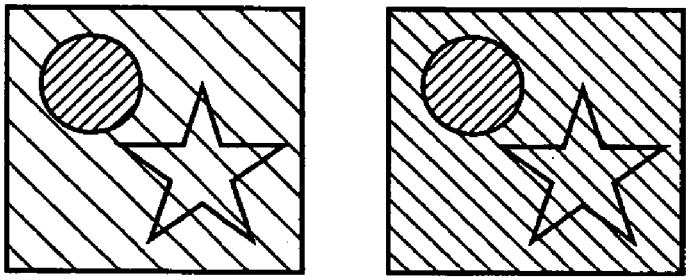
FIG. 11 is a view showing an example of a user interface window in utilization according to the embodiment of the present invention.

FIG. 11 is a view showing an example of a confirmation window presented to the user in step S408.

Referring to FIG. 11, when "YES" is clicked on in a confirmation window 1101, affirmative determination is done. On the other hand, when "NO" is clicked on, negative determination is done.

In step S409, the acquired image data is output as image data as the extraction target, and the processing is ended. In step S410, image data obtained by extracting the designated region portion from the background image is output as image data as the extraction target, and the processing is ended. In step S411, image data corresponding to the designated region is acquired from image data obtained by decompressing the compression code A 122 as the information of the text part. The data is output as image data as the extraction target, and the processing is ended.

The image data output in one of steps S409 to S411 can be used in another application for document editing by the user. For example, when the clipboard function of Windows® is used, the user can use the data in an arbitrary application by copying the image data to the clipboard.

Especially, when the image data acquired from the database contains data including a rendering command, the data can suitably be used in the document editor application for the purpose of editing/processing.

Other Embodiment of the Present Invention

The means included in the image processing apparatus and the steps of the image processing method according to the above-described embodiment of the present invention can be implemented by operating a program stored in the RAM or ROM of a computer. The program and a computer-readable recording medium that records the program are incorporated in the present invention.

The present invention can also be implemented as, e.g., a system, apparatus, method, program, or recording medium.

More specifically, the present invention can be applied to a system including a plurality of devices or an apparatus including a single device.

The present invention is also achieved even by supplying a software program (a program corresponding to the flowcharts shown in FIGS. 4 and 5 in this embodiment) which implements the functions of the above-described embodiment to the system or apparatus directly or from a remote site and causing the computer of the system or apparatus to read out and execute the supplied program code.

Hence, the program code itself, which is installed in a computer to implement the functional processing of the present invention by the computer, also implements the present invention. That is, the computer program to implement the functional processing of the present invention is also incorporated.

In this case, the program can take any form such as an object code, a program to be executed by an interpreter, or script data to be supplied to the OS as long as the functions of the program can be obtained.

As a recording medium to supply the program, for example, a floppy® disk, hard disk, optical disk, magnetooptical disk, MO, CD-ROM, CD-R, CD-RW, magnetic tape, nonvolatile memory card, ROM, or DVD (DVD-ROM or DVD-R) can be used.

As another program supply method, a client computer may be connected to a homepage on the Internet by using a browser in the client computer, and the computer program itself of the present invention or a compressed file containing an automatic install function may be downloaded from the homepage to a recording medium such as a hard disk.

The program code contained in the program of the present invention may be divided into a plurality of files, and the files may be downloaded from different homepages. That is, a WWW server which causes a plurality of users to download a program file that causes a computer to implement the functional processing of the present invention is also incorporated in the present invention.

The program of the present invention may be encrypted, stored in a recording medium such as a CD-ROM, and distributed to users. Any user who satisfies predetermined conditions may be allowed to download key information for decryption from a homepage through the Internet, execute the encrypted program by using the key information, and install the program in the computer.

The functions of the above-described embodiment are implemented not only when the readout program is executed by the computer but also when, e.g., the OS running-on the computer performs part or all of actual processing on the basis of the instructions of the program.

The functions of the above-described embodiments are also implemented when the program read out from the recording medium is written in the memory of a function expansion board inserted into the computer or a function expansion unit connected to the computer, and the CPU of the function expansion board or function expansion unit performs part or all of actual processing on the basis of the instructions of the program.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-203579, filed Jul. 12, 2005, which is hereby incorporated by reference herein in its entirety.

What is claimed is:

1. An image processing apparatus comprising:
an image data storage unit adapted to store data contained in an image;
an image reading unit adapted to convert contents of a paper document into the image by photoelectric conversion;
a region specifying unit adapted to partially or entirely specify the read image by said image reading unit;
an image compression unit adapted to compress the read image by said image reading unit to generate compressed data;
an image data search unit adapted to search said image data storage unit for image data similar to a specific region specified by said region specifying unit; and
an information adding unit adapted to add, to the compressed data, a result of search by said image data search unit corresponding to the specific region specified by said region specifying unit as related image information.

2. The apparatus according to claim 1, further comprising:
an extraction unit adapted to extract image data of a region designated by a user for the compressed data compressed by said image compression unit; and
a notification unit adapted to, if related image information of the designated region is present in the compressed data, notify the user of presence of the related image information.

3. The apparatus according to claim 1, wherein said image data search unit executes search by matching a feature amount in the specific region of the read image with a feature amount of the stored image data.

4. The apparatus according to claim 1, wherein the data contained in the image includes an uncompressed raster image, a compressed raster image, and an instruction group to render an image.

5. The apparatus according to claim 3, wherein the feature amount in the specific region of the read image is an image feature amount calculated from the image data.

6. The apparatus according to claim 1, wherein the related image information lists location information of image data contained in the search result by said image data search unit.

7. The apparatus according to claim 6, wherein the related image information includes information about whether the image data contained in the search result by said image data search unit is editable.

8. The apparatus according to claim 2, wherein said notification unit notifies the user of the number of related images corresponding to the designated region.

9. The apparatus according to claim 2, wherein said notification unit notifies the user whether editable image data is contained in the related image information corresponding to the designated region.

10. The apparatus according to claim 1, further comprising a transmission unit adapted to transmit the compressed data compressed by said image compression unit to another apparatus through a network.

11. An image processing method comprising the steps of:
storing data contained in an image:
converting contents of a paper document into the image by photoelectric conversion;
partially or entirely specifying the image;
compressing the image to generate compressed data;
searching for image data similar to a specific region specified in the specifying step; and
adding, to the compressed data, a result of search in the image data search step corresponding to the specific region specified on the specifying step as related image information.

12. A computer readable storage medium on which is stored a computer program which causes a computer to execute steps of an image processing method of claim 11.

13. An image processing apparatus comprising:
a processor for executing a computer-readable program; and
a memory medium on which is stored the computer-readable program to be executed by the processor, the program comprising computer executable code that, when executed by the processor, performs the steps of (a) storing data contained in an image, (b) converting contents of a paper document into the image by photoelectric conversion, (c) partially or entirely specifying the image, (d) compressing the image to generate compressed data, (e) searching for image data similar to a specific region specified in the specifying step, and (f) adding, to the compressed data, a result of search in the image data search step corresponding to the specific region specified on the specifying step as related image information.

* * * * *

UNITED STATES PATENT AND TRADEMARK OFFICE
CERTIFICATE OF CORRECTION

PATENT NO. : 7,420,150 B2 Page 1 of 1
APPLICATION NO. : 11/483059
DATED : September 2, 2008
INVENTOR(S) : Tomotoshi Kanatsu It is certified that error appears in the above-identified patent and that said Letters Patent is hereby corrected as shown below:

DRAWINGS:
Sheet 8, FIG. 8, "</Releated>" should read -- </Related> --.

COLUMN 4:
Line 16, "obtains," should read -- obtains --.

COLUMN 6:
Line 24, "black pixel blocks orderly" should read -- orderly black pixel blocks --.

COLUMN 10:
Line 48, "running-on" should read -- running on --.

COLUMN 12:
Line 13, "image:" should read -- image; --;
Line 22, "on" should read -- in --; and
Line 42, "on" should read -- in --.

Signed and Sealed this

Fifth Day of May, 2009

JOHN DOLL
*Acting Director of the United States Patent and Trademark Office*